Nov. 23, 1965     D. W. McCULLOCH ETAL     3,219,283
COMMINUTING MACHINE
Filed March 8, 1963     2 Sheets-Sheet 1
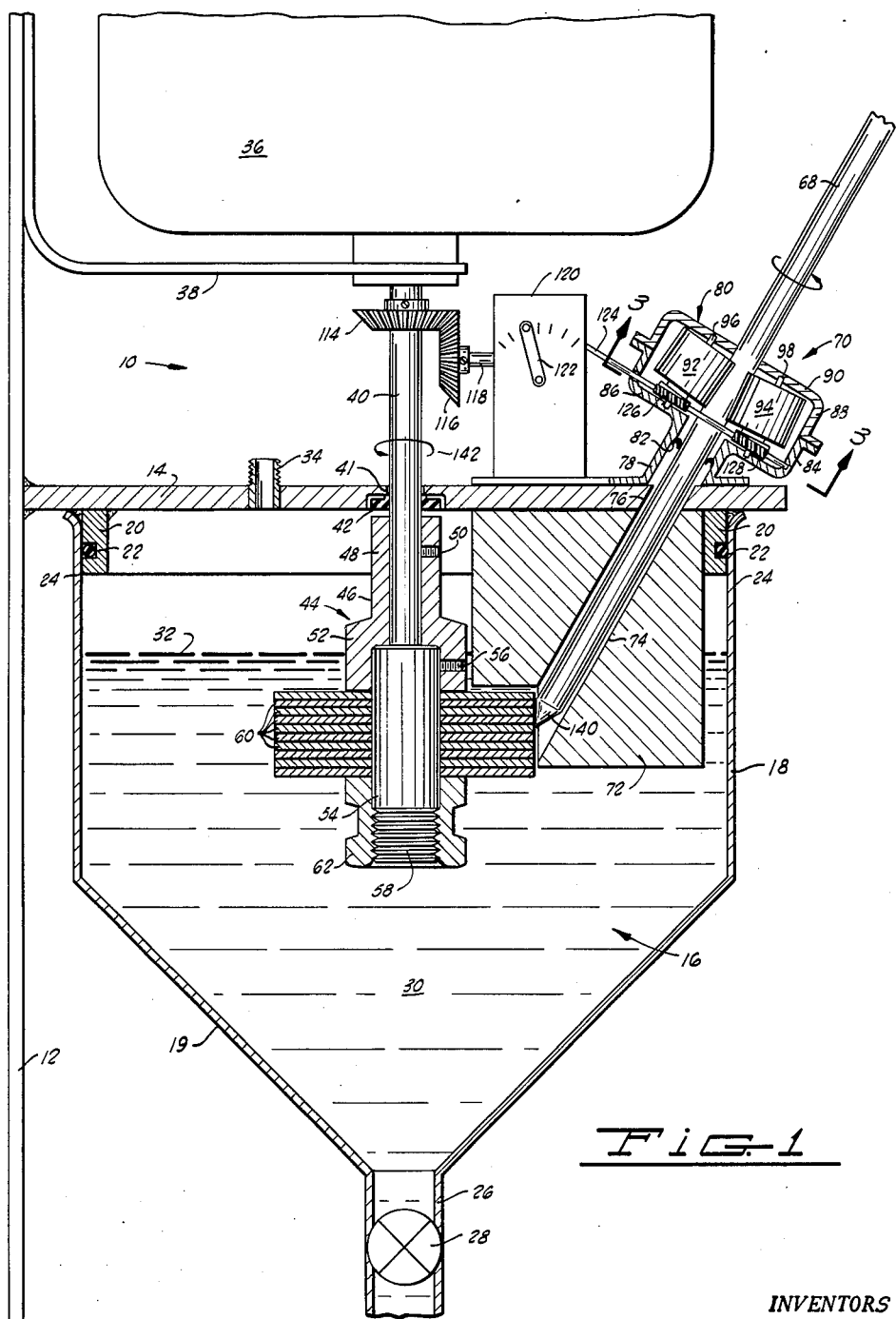
*Fig. 1*
INVENTORS
DOYLE W. McCULLOCH
WILLIAM H. HARWOOD
BY 
ATTORNEY Nov. 23, 1965  D. W. McCULLOCH ETAL  3,219,283
COMMINUTING MACHINE
Filed March 8, 1963  2 Sheets-Sheet 2

INVENTOR.
DOYLE W. McCULLOCH
WILLIAM H. HARWOOD
BY

ATTORNEY 3,219,283
COMMINUTING MACHINE
Doyle W. McCulloch, Blackwell, and William H. Harwood, Ponca City, Okla., assignors to Continental Oil Company, Ponca City, Okla., a corporation of Delaware
Filed Mar. 8, 1963, Ser. No. 263,831
13 Claims. (Cl. 241—46)

The present invention relates to comminution and more particularly, but not by way of limitation, relates to a machine for cutting solid bar stock such as aluminum into small chips having a high surface area-to-volume ratio under controlled atmospheric conditions.

There are a large number of applications where small particles of metal having a high surface area-to-volume ratio are highly desirable. This is particularly true where the metal particles are to be used in a chemical reaction in which an increased reaction rate can be attained by increasing the available metal surface area. For example, the commercial manufacture of aluminum alkyls and Grignard reagents requires metal particles having high surface area-to-volume ratios for greatest operating efficiency, and in the manufacture of aluminum paint pigments, the smaller the particle size of aluminum fed to the ball milling step, the lower the cost of manufacturing a given grade of pigment.

In those cases where the metal is to be used in a chemical reaction, it is usually desirable, if not absolutely essential, to prevent a air and/or moisture from contacting the newly created metal surface. This is particularly true of aluminum because aluminum will almost instantaneously be oxidized by the atmosphere to produce an aluminum oxide film which would of course greatly retard the chemical reaction. Also, many pure metals such as aluminum are difficult to comminute into small chips because the metal is pliable and does not readily break but must be cut over the entire surface of separation. As a result, traces of other metals have heretofore been added in order to improve the chip breaking characteristics of the pure metal. In many cases, however, especially where the metal particles are to be used for chemical processes, even the addition of trace amounts of other metals is undesirable. Further, the level of metal additives necessary to obtain chip breaking characteristics is frequently uneconomical.

Many comminution machines have been proposed for cutting solid metal bars into particles. Some of these machines have accomplished this comminution under an inert atmosphere, either gaseous or liquid. However, these comminuting machines have for various reasons not proved completely satisfactory. For example, many of the machines do not comminute the solid stock into uniform particles of very small size which can easily be entrained in a liquid stream, yet which particles are not powdered or granular so as to tend to clog the cutting element and collect in corners, cracks and the like of the transfer system. The problem of comminuting solid stock is considerably complicated as the required quantity increases, and this is particularly true if it is necessary to comminute the bar stock under a controlled atmosphere, as is necessary for aluminum which is to be used as a catalyst or reagent in a chemical reaction.

Therefore it is an object of the present invention to provide an improved comminuting machine for cutting solid bar stock such as aluminum into a plurality of uniformly sized, thin flakes having a relatively high surface area-to-volume ratio.

Another object of the present invention is to provide a comminuting machine of the type described wherein the solid bar stock is continuously comminuted under a controlled atmosphere.

Yet another object of the present invention is to provide a comminuting machine of the type described wherein the solid bar stock can be comminuted under an inert liquid or under a liquid reagent without the provision of any costly liquid seals between a container and moving parts.

A still further object of the present invention is to provide an improved mechanism for feeding an elongated, cylindrical bar stock into the comminution zone.

Yet another object of the present invention is to provide a machine of the type described wherein the cutting element and the bar stock being comminuted will be continuously and effectively cooled and lubricated.

A still further object of the present invention is to provide a comminuting machine of the type described which is self-cleaning and relatively free from clogging.

Another object of the present invention is to provide a novel cutting element for a machine of the type described which continuously agitates a liquid blanketing the cutting element and bar stock in such a manner as to facilitate entrainment of the freshly cut particles for transfer from the machine.

Yet another object of the present invention is to provide a comminuting machine of the type described which is very simple in construction, can be economically manufactured, easily operated and easily serviced, and which will have a long service life.

Many additional objects and advantages of the present invention will be evident from the following detailed description and drawings, wherein:

FIG. 1 is a side elevational view in section of a comminuting machine constructed in accordance with the present invention;

Figure 2:
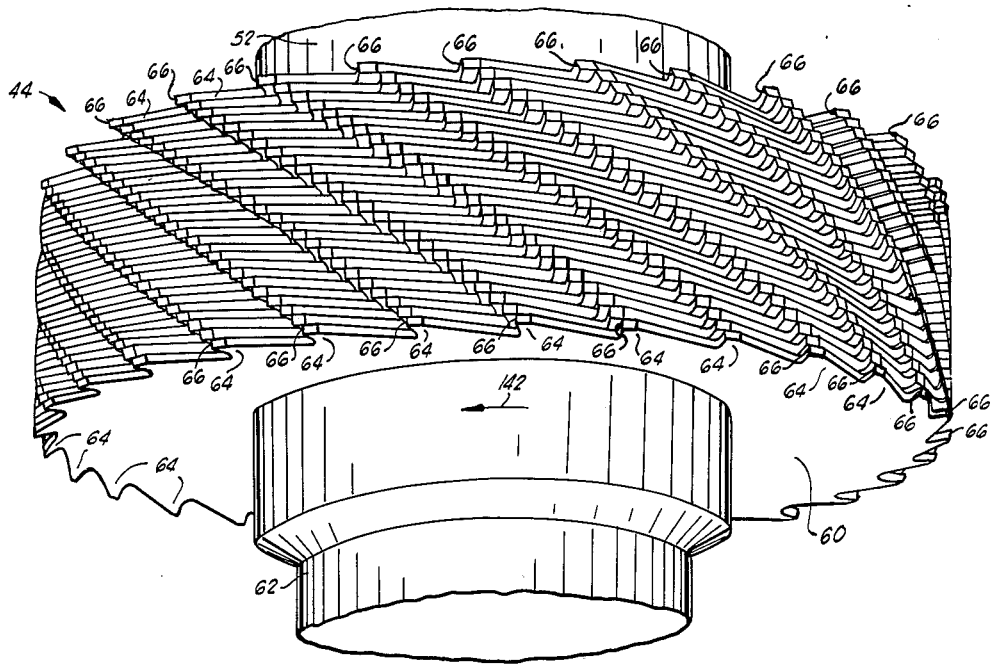
FIG. 2 is a perspective view of the cutting element of the comminuting machine of FIG. 1.

Referring now to the drawings, and in particular to FIG. 1, a comminuting machine constructed in accordance with the present invention is indicated generally by the reference numeral 10. The comminuting machine 10 may conveniently comprise an upright support member 12 to which a horizontally disposed plate 14 is welded or otherwise connected. The plate 14 serves as both a support for a feed mechanism which will hereafter be described, and as the top wall of an atmospheric control chamber indicated generally by the reference numeral 16.

The atmospheric control chamber 16 may conveniently be formed by a cylindrical liquid receptacle 18 which is telescoped around a downwardly extending, circular skirt 20 which may be welded or otherwise connected to the underside of the horizontal plate 14. An O-ring 22 may be provided between the upper lip 24 of the liquid receptacle 18 and the skirt 20 to provide a fluidtight seal. The bottom of the liquid receptacle 18 is preferably funnel-shaped substantially as illustrated at 19 and an outlet conduit 26 may be connected to the funnel-shaped bottom 19 for transporting fluid and cut chips from the receptacle 18. The conduit 26 may be opened and closed by a suitable valve 28, and the valve 28 may be adjusted to restrict the volume of liquid leaving the receptacle 18 in order to maintain a liquid 30 within the receptacle 18 at a desired level 32. A fluid inlet 34 may be provided in the horizontal plate 14 for introducing the liquid 30 to the receptacle 18 at a sufficient rate to maintain the desired liquid level.

An electric drive motor 36 may conveniently be supported by a suitable bracket 38 which may be connected to the upright support plate 12. The electric motor 36 has a vertically disposed shaft 40 which extends downwardly through an aperture 41 in the horizontal plate 14 into the atmospheric control chamber 16. A resilient sealing means 42 may be provided at the joint between the drive shaft 40 and the horizontal plate 14 in order to maintain a fluidtight atmospheric control chamber 16 for purposes which will presently be described. A cutting element indicated generally by the reference numeral 44 is generally cylindrical in shape and may be secured to the drive shaft 40 by an adapter coupling 46 having an upper sleeve portion 48 which is telescoped over the drive shaft 40 and secured in place by a set screw 50. The adapter coupling 46 has a lower portion 52 having a greater internal diameter which receives a substantially larger pin 54 which is secured in the adapter coupling 46 by a set screw 56. The lower end of the pin 54 is provided with suitable threads 58. A plurality of disc-shaped cutting members 60 are disposed around the pin and secured in place by a nut 62. Each of the disc-shaped cutting members 60 may be keyed to the pin 54, although in most cases the nut 62 will be sufficient to hold the cutting members in proper alignment, as will presently be described. Each of the cutting members 60 is fabricated from plate steel having a plurality of teeth 64 at circumferentially spaced points around the periphery thereof. Each of the teeth 64 has a cutting edge 66 which is disposed generally parallel with the pin 54 which serves as the axis of rotation of the cutting element 44, and all of the cutting edges 66 of the several cutting members 60 lie in a common surface of revolution which is preferably cylindrical in shape. As can best be seen in FIG. 2, the teeth 64 of each adjacent cutting member 60 are staggered slightly in order to provide a plurality of continuous rows of teeth which extend helically around the cylindrical surface of the cutting element 44. This helical alignment of the teeth both staggers the cutting edges to produce a multitude of flakes of predetermined width and also forms a fluid impeller for purposes which will hereafter be described in greater detail. In this regard it will be noted that the teeth 64 are sufficiently long in the circumferential dimension that the adjacent teeth overlap and provide a continuous rib extending helically around the cutting element 44.

Figure 3:
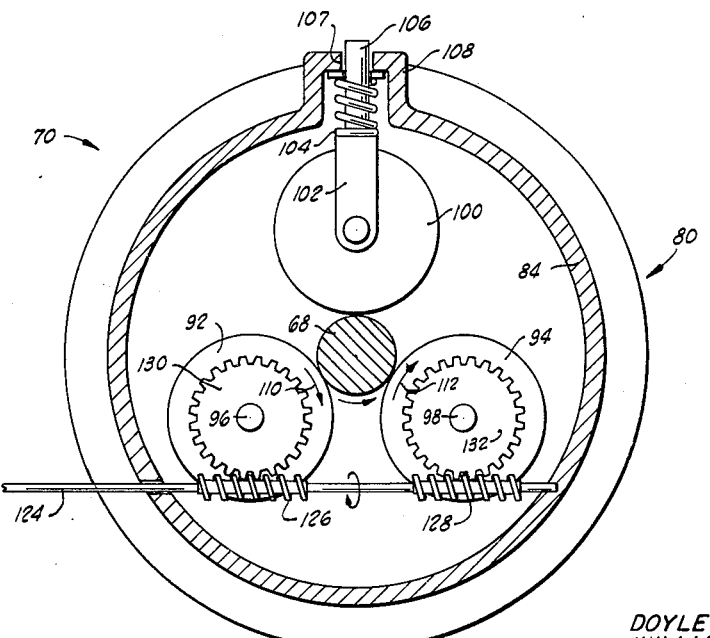
FIG. 3 is a sectional view taken substantially on lines 3—3 of FIG. 1 and better illustrates the novel bar stock feeding mechanism of the invention.

A feed stock advancing mechanism for continuously feeding an elongated, cylindrical bar stock 68 into the surface of revolution of the cutting element 44 is indicated generally by the reference numeral 70 in FIGS. 1 and 3. A guide block 72 is welded or otherwise connected to the underside of the horizontal plate 14. An elongated feed stock guide passageway 74 is formed by a bore in the block 72 and is directed to intersect the surface of revolution of the cutting edges 66 at an acute angle to the axis of rotation of the cutting element 44. Further, the guide passageway 74 is preferably coplanar with the drive shaft 40 and therefore the axis of rotation of the cutting element 44. The passageway 74 registers with an aperture 76 in the horizontal plate 14 and is aligned with the tubular lower portion 78 of the feed mechanism housing indicated generally by the reference numeral 80. A resilient annular sealing ring 82 may be provided in the lower portion 78 of the housing to provide a continuous, substantially fluidtight seal with the cylindrical bar stock 68 as it is being fed into the surface of revolution, as hereafter described in greater detail.

The housing 80 has what may be considered a lower half 84 which forms a lower journal plate 86 disposed normal to the axis of the feed stock 68. The upper half 88 of the housing 80 which is mated to the lower half 84 also has an upper journal plate 90 which is disposed generally parallel to the lower journal plate 86. Two drive rollers 92 and 94 are connected to axles 96 and 98, respectively, the ends of which are journalled in the lower and upper plates 86 and 90, respectively. A third idler roller 100 is connected to an axle which is journalled in a yoke 102 having a pin 106 which is received in a guide aperture 107 in a recess 108 of the housing 80. A coil spring 104 is disposed around the pin 106 and is received in the recess 108 for biasing the idler roller 100 against the feed stock bar 68 disposed along the feed axis so that the feed stock bar 68 will be tightly held between the three rollers 92, 94 and 100 which are circumferentially spaced around the feed stock bar 68 substantially as illustrated in FIG. 3.

The axles 96 and 98 are positioned askew to the longitudinal axis of the feed stock bar 68, which for convenience is hereinafter referred to as the feed axis, such that is the respective rollers 92 and 94 are rotated by a drive mechanism presently to be described, and the feed stock bar 68 rotated about the feed axis, each point on the periphery of the drive rollers which contacts the feed stock bar 68 will thereafter have a component of motion toward the cutting element 44 as the respective roller continues to rotate. Thus, by reference to FIG. 1, it will be noted that the lower ends of the axles 96 and 98 should be canted outwardly from the page and also outwardly from the feed stock bar 68 if the drive rollers 92 and 94 rotate in the directions of the arrows 110 and 112, respectively. The driver rollers 92 and 94 are rotated in the directions of the arrows 110 and 112 by a drive train extending from the drive shaft 40 of the motor 36. The drive train includes a bevel gear 114 connected to the drive shaft 40 which is in mesh with a bevel gear 116 connected to the input shaft 118 of a variable speed transmission 120. The variable speed transmission 120 preferably has a manually operated control arm 122 by which the speed and direction of rotation of the output shaft 124 can be varied. The output shaft 124 has a pair of worm gears 126 and 128 which are in mesh with gears 130 and 132, respectively, which in turn are connected to the axles 96 and 98, respectively, to rotate the axles and rollers in the desired directions.

In operation the liquid 30, which may be kerosene or one of the liquid reagents of a particular chemical reaction to which the comminuted material is to be added, such as, for example, aluminum triethyl, is established to the level 32 in the receptacle 18 either by closing the valve 28 and filling the receptacle, or by continuously adding liquid to the receptacle through the inlet 34 at the same rate the liquid is removed through the valve 28. Then when the motor 36 is started and the cutting element 44 rotated at a relatively high speed, the entire surface of revolution formed by the cutting edges 66 will be submerged in the liquid, as will the end of the feed stock bar 68.

Operation of the motor 36 will also drive the rollers 92 and 94 by means of the drive train including the variable speed transmission 120, so that the feed stock bar will be rotated about its longitudinal axis, i.e., about the feed axis, and will also be advanced into the surface of revolution formed by the cutting edges 66. The advancing motion of the cylindrical feed stock bar 68 is accomplished by reason of the fact that the axles 96 and 98 of the drive rollers 92 and 94 are askew from the axis of rotation of the feed stock bar 68. Due to the alignment of the axles, each point on the periphery of the rollers 92 and 94 which contacts the feed stock bar 68 will have a component of motion toward the surface of revolution of the cutting edges 66 as the respective roller rotates, and while the point is still in contact with the feed stock bar.

As the feed stock bar 68 is both advanced and rotated, the cutting edges 66 of the cutting element 44 will cut small, relatively thin flakes from the end of the feed stock bar 68, and it will be evident that a conical surface, substantially as illustrated in FIG. 1, will result. It will be appreciated that the cutting edges 66 move in an arcuate path and have a short, but finite length, as defined by the axial direction of the cutting element 44. Therefore as the arcuate paths of the cutting edges 66 intersect the oppositely curved surface of the conical point on the rod stock 68, each cutting edge 66 will cleanly cut a thin chip from the rod stock having a width corresponding to the axial length of the cutting edge, a length corresponding to the arc of the surface of the rod intersected by the arc of the cutting edge, and a maximum thickness corresponding to the amount of overlap of the two arcs, and a plurality of very thin flakes of substantially the same size and having a relatively high surface area-to-volume ratio will be cut from the end of the bar stock 68.

As the feed stock bar 68 is rotated about its longitudinal axis, it will be evident that a major portion of the conical point 140 will not be exposed to the cutting action, but will be wholly submerged within the liquid 30 so as to be very effectively cooled. Since the cutting element 44 is rotated in the liquid 30 it will also be effectively cooled as well as cleaned of the particles being cut. Both the cooling and cleaning features of the cutting element 44 are facilitated by the helical ridges formed on the cutting element by the teeth 64 of the various cutting members 60 which form a fluid impeller. The drive shaft 40 will normally be rotated in the direction of the arrow 142 so that the fluid impeller will tend to propel the liquid 30 downwardly along the center of the receptacle 18 toward the fluid outlet 26 and at the same time agitate the liquid throughout the receptacle 18. The impeller funcion of the cutting element 44 is enhanced by the close proximity of the block 72 so that substantial fluid velocities are created between the rows of teeth to very effectively remove the cuttings from between the rows of teeth as the particles are cut from the bar stock. At the same time, the particles are entrained in the liquid and propelled downwardly toward the fluid outlet 26.

It will also be evident that the feed mechanism 70 provides a relatively simple and effective means for both rotating the feed stock bar 68 about its longitudinal axis and feeding the feed stock bar longitudinally into the surface of revolution of the cutting edges 66. The speed at which the feed stock bar 68 is rotated and also the speed at which it is advanced can be controlled by the variable speed transmission 120. Further, the ratio between the rate at which the feed stock bar 68 is rotated and the rate at which it is advanced into the comminution zone can be varied by changing the pitch of the axles 96 and 98 of the drive rollers 92 and 94. It will also be noted that in the event of a malfunction in the comminution zone, the frictionally engaging drive rollers 92 and 94 provide a means for slippage so as to prevent further destruction of the machine.

It will be evident to those skilled in the art that the comminuting machine may be very economically manufactured and can be easily assembled and serviced. The electric motor 36 of course can be standard and can be permanently mounted on the bracket 38. The drive shaft 40 may be the drive shaft of the electric motor 36 or may be a suitable extension. In any event, it is inserted through the aperture in the horizontal plate 14 and the sealing gasket 42 and need not be removed again until it is required to replace the motor 36. The cutting element 44 can then be connected to the drive shaft 40 merely by telescoping the adapter coupling 46 over the drive shaft and securing the set screw 50 in a notch (not illustrated) provided in the drive shaft 40. Of course it will be appreciated that the cutting element 44 can be assembled completely before connection to the drive shaft 40 or can be assembled in place on the drive shaft 40. In either event, it will be evident that the cutting element 44 can be assembled merely by placing the pin 54 in place in the adapter coupling 46 and securing the set screw 56. Then the plurality of cutting members 60 may be properly oriented on the pin 54 so that the teeth 64 form the helical impeller ridges and the nut 62 tightened on the threads 58 to secure the cutting members 60 in place. If necessary, a set screw (not illustrated) may be provided in the nut 62 to prevent loosening. It will also be evident that the cutting members 60 may be identical in construction provided that any keying means (not illustrated) used makes provision for the helical alignment of the corresponding teeth. It will be evident that no keying means will be necessary in many cases because the torque acting on the cutting members 60 will be slight and the nut 62 will be adequate to securely hold the cutting members 60 in place. It should be noted that the block 72 and the feed mechanism 70 are all mounted on and supported by the horizontal plate 14. Therefore, the receptacle 18 may be merely disconnected from its support (not illustrated) and dropped downwardly so as to expose the cutting element 44 for service. When it is desired to remove the cutting members 60 for sharpening of the cutting edges 66 or other service work, only the nut 62 need be removed. Or, if desired, either of the set screws 50 or 56 can be loosened to disconnect the cutting element 44.

Although a particular embodiment of the present invention has been described in detail, it is to be understood that various changes, substitutions and alterations can be made therein without departing from the spirit and scope of the invention as defined by the appended claims.

What is claimed is:

1. A machine for comminuting solid rod stock into thin flakes having a high surface area-to-volume ratio, the machine comprising:
   a drive shaft;
   means connected to the drive shaft for rotating the drive shaft;
   a cutting element connected to the drive shaft and having a plurality of peripherally spaced teeth each having a cutting edge, the cutting edges of the teeth lying substantially in a common surface of revolution about the drive shaft; and,
   feed means for simultaneously rotating a cylindrical rod about its longitudinal axis and advancing the end of the rod into the surface of revolution at an acute angle to the surface of revolution, said feed means comprising:
      guide means for positioning the rod stock along a feed axis disposed at an acute angle to the surface of revolution;
      a plurality of rollers disposed around the feed axis for engaging and supporting a rod stock positioned along the feed axis, at least one of the rollers having an axis of rotation askew from the feed axis such that each point on the periphery of the roller that contacts the rod stock will have a component of motion toward the surface of revolution as the roller continues to rotate; and,
      means operatively connected to said means for rotating the drive shaft and to at least one of the rollers for rotating the roller.

2. A machine for comminuting solid rod stock into thin flakes having a high surface area-to-volume ratio, the machine comprising:
   a drive shaft;
   means connected to the drive shaft for rotating the drive shaft;
   a cutting element connected to the drive shaft and having a plurality of peripherally spaced teeth each having a cutting edge, the cutting edges of the teeth lying substantially in a common surface of revolution about the drive shaft; and,
   feed means for simultaneously rotating a cylindrical rod about its longitudinal axis and advancing the end of the rod into the surface of revolution at an acute angle to the surface of revolution, said feed means comprising:
      guide means for positioning a cylindrical rod along a feed axis disposed at an acute angle to the surface of revolution;
      at least three rollers having axles journaled at equally spaced points around the feed axis, the axle for at least one of the rollers being askew from the feed axis such that each point on the periphery of the roller that contacts the cylindrical rod will have a component of motion toward the surface of revolution as the rollers rotates, at least one of the rollers being spring biased into contact with the cylindrical rod; and, second drive means operatively interconnecting the drive shaft and at least one of the rollers for rotating the roller.

3. A machine for comminuting solid rod stock into thin flakes having a high surface area-to-volume ratio as defined in claim 1 wherein the cutting element is comprised of:

a plurality of disc-shaped members each having a plurality of circumferentially spaced teeth thereon, each tooth having an axially disposed cutting edge at the same distance from the center of the member, the plurality of disc-shaped members being disposed in side-by-side relationship with the centers aligned to form an axis of rotation with the cutting edges in a common surface of rotation, the cutting edges of corresponding teeth of the disc-shaped members being circumferentially offset and in helical alignment to form a fluid impeller, whereby as the cutting element is rotated to cut the cylindrical rod into thin flakes, fluid will be impelled between the helically aligned teeth to facilitate cooling and cleaning of the cutting element.

4. A machine for comminuting solid rod stock into thin flakes having a high surface area-to-volume ratio under a controlled atmosphere, the machine comprising:

a fluid receptacle for holding liquid up to a certain level;

a drive shaft extending downwardly into the fluid receptacle to a point below the liquid level;

drive means operatively connected to the drive shaft for rotating the drive shaft;

a cutting element connected to the drive shaft and disposed below the liquid level, the cutting element having a plurality of periphally spaced teeth each having a cutting edge, the cutting edges of the teeth lying substantially in a common surface of revolution about the drive shaft;

rod stock guide means having a feed axis extending downwardly into the fluid receptacle for guiding the end of a cylindrical rod into the surface of revolution; and feed means operatively connected to said drive means for moving a cylindrical rod along the feed axis into the surface of revolution, whereby the cylindrical rod will be cut into a plurality of thin flakes under a liquid standing in the receptacle up to the liquid level.

5. A machine for comminuting solid rod stock into thin flakes having a high surface area-to-volume ratio under a controlled atmosphere as defined in claim 4 wherein the fluid receptacle is further characterized by:

a funnel-shaped liquid outlet in the bottom thereof; and, a fluid inlet, whereby a liquid may be introduced through the inlet into the receptacle at a rate sufficient to maintain a constant liquid level above the cutting element to cool and lubricate the cutting element and rod and to entrain the flakes in the liquid as the liquid is removed through the outlet for transportation to a reaction vessel or the like.

6. A machine for comminuting solid rod stock into thin flakes having a high surface area-to-volume ratio under a controlled atmosphere as defined in claim 5 wherein the cutting element is further characterized in that:

the peripherally spaced teeth are generally helically aligned to form a fluid impeller having helical ridges and grooves; and, the cutting element is rotated in a direction to propel liquid and the entrained flakes toward the liquid outlet.

7. A machine for comminuting solid rod stock into thin flakes having a high surface area-to-volume ratio under a controlled atmosphere, the machine comprising:

a generally horizontally disposed plate means having a bottom surface;

a fluid receptacle having a large mouth sealed to the bottom surface of the horizontal surface and positioned under the horizontally disposed plate means;

a drive shaft extending downwardly through the horizontally disposed plate means into the fluid receptacle;

first fluid sealing means disposed between the drive shaft and the horizontally disposed plate means;

drive means operatively connected to the drive shaft above the horizontally disposed plate means for rotating the drive shaft;

a cutting element connected to the drive shaft and disposed below the horizontally disposed plate means in the receptacle, the cutting element having a plurality of peripherally spaced teeth each having a cutting edge, the cutting edges of the teeth lying substantially in a common surface of revolution about the drive shaft, the cutting element having a maximum dimension which will pass through the large mouth of the fluid receptacle when the fluid receptacle is lowered to gain service access to the cutting element;

rod stock guide means having a feed axis extending downwardly into the fluid receptacle for guiding the end of a cylindrical rod into the surface of revolution;

second fluid sealing means disposed around the feed axis for providing a fluid seal between the horizontally disposed plate means and a cylindrical rod disposed along the feed axis; and, feed means for moving the cylindrical rod along the feed axis into the surface of revolution, whereby the cylindrical rod will be cut into a plurality of thin flakes under a controlled atmosphere of liquid or gas.

8. A machine for comminuting solid rod stock into thin flakes having a high surface area-to-volume ratio under a controlled atmosphere as defined in claim 7 wherein the feed means is mounted on the horizontally disposed plate means and is comprised of:

a plurality of rollers disposed around the feed axis for engaging and supporting a rod stock positioned along the feed axis, at least one of the rollers having an axis of rotation askew from the feed axis such that each point on the periphery of the roller that contacts the rod stock will have a component of motion toward the surface of revolution as the roller continues to rotate; and, second drive means operatively connected to at least one of the rollers for rotating the roller, whereby the rod stock will be simultaneously rotated about the feed axis and advanced into the surface of revolution and will be cut into thin flakes having a high surface area-to-volume ratio.

9. A machine for comminuting solid rod stock into thin flakes having a high surface area-to-volume ratio under a controlled atmosphere as defined in claim 7 wherein:

the second drive means operatively interconnects the drive shaft and the feed means and includes a variable speed transmission, whereby the rate at which the cylindrical rod is rotated about the feed axis and advanced into the surface of revolution can be varied with respect to the speed of rotation of the cutting element so that the size of the flakes can be controlled.

10. A machine for comminuting solid rod stock into thin flakes having a high surface area-to-volume ratio, the machine comprising:
  an upright support;
  a horizontally disposed plate means connected to the upright support;
  a motor connected to the upright support above the plate means and having a drive shaft extending downwardly through the plate means to a point therebelow;
  a cutting element connected to the drive shaft and having a plurality of peripherally spaced teeth each having a cutting edge, the cutting edges of the teeth lying substantially in a common surface of revolution about the drive shaft;
  guide means extending from above the plate means to a point below the plate means for guiding a cylindrical rod into the surface of revolution;
  feed means operatively connected to said motor and mounted on top of the plate means for simultaneously rotating a cylindrical rod about the longitudinal axis thereof and advancing the rod through the guide means into the surface of revolution; and,
  liquid receptacle means surrounding the cutting element and disposed below the plate means for holding liquid to a level above the cutting element,
  whereby the cylindrical rod will be cut into thin flakes under the liquid.

11. A machine for comminuting solid rod stock into thin flakes having a high surface area-to-volume ratio as defined in claim 10 further characterized by:
  first fluid sealing means between the drive shaft and the plate means;
  second fluid sealing means between the liquid receptacle means and the plate means; and,
  third fluid sealing means operatively associated with the guide means for providing a fluid seal between a cylindrical rod being fed along the guide means and the plate means,
  whereby an atmospheric control chamber is provided around the cutting element and the cylindrical rod may be cut into flakes under a controlled gaseous atmosphere or the like.

12. A machine for comminuting solid rod stock into thin flakes having a high surface area-to-volume ratio as defined in claim 11 wherein:
  at least a portion of the bottom of the liquid receptacle means forms a funnel leading to a fluid outlet, and the machine is further characterized by
  fluid inlet means in one of the plate means and the liquid receptacle means for introducing fluid into the atmospheric control chamber,
  whereby a continuous flow of fluid can be introduced to the chamber for cooling and cleaning the cutting element and the cylindrical rod, and for entraining the freshly cut flakes and transporting the flakes from the chamber to a reaction vessel or the like.

13. A machine for comminuting solid rod stock into thin flakes having a high surface area-to-volume ratio as defined in claim 12 wherein:
  the peripherally spaced teeth of the cutting element are helically aligned to form a fluid impeller having helical ridges and grooves; and,
  the cutting element is rotated in a direction to propel liquid and flakes entrained therein downwardly toward the fluid outlet.

References Cited by the Examiner

UNITED STATES PATENTS

| 758,042 | 4/1904 | Bartlett | 241—295 |
| 2,335,515 | 11/1943 | Jehle | 241—295 X |
| 2,552,889 | 5/1951 | Eaton | 241—293 |
| 2,642,068 | 6/1953 | Urschel | 130—9 |
| 2,689,092 | 9/1954 | Clark et al. | 241—295 X |
| 2,912,023 | 11/1959 | Baker | 241—279 |

FOREIGN PATENTS

| 84,043 | 11/1895 | Germany. |
| 147,714 | 11/1920 | Great Britain. |

ROBERT C. RIORDON, *Primary Examiner.*
J. SPENCER OVERHOLSER, *Examiner.*